United States Patent
Kim et al.

(10) Patent No.: US 12,013,312 B2
(45) Date of Patent: Jun. 18, 2024

(54) SENSOR TUBE FOR HUMIDITY SENSOR AND HUMIDITY SENSOR ASSEMBLY USING SAME

(71) Applicant: KOREA ATOMIC ENERGY RESEARCH INSTITUTE, Daejeon (KR)

(72) Inventors: Yeon Sik Kim, Sejong (KR); Tae Soon Kwon, Daejeon (KR); Dong Jin Euh, Daejeon (KR); Hae Seob Choi, Cheongju-si (KR); Woo Shik Kim, Daejeon (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 392 days.

(21) Appl. No.: 17/293,670

(22) PCT Filed: Oct. 11, 2019

(86) PCT No.: PCT/KR2019/013317
§ 371 (c)(1),
(2) Date: May 13, 2021

(87) PCT Pub. No.: WO2020/111502
PCT Pub. Date: Jun. 4, 2020

(65) Prior Publication Data
US 2022/0011190 A1 Jan. 13, 2022

(30) Foreign Application Priority Data
Nov. 27, 2018 (KR) .................. 10-2018-0148784

(51) Int. Cl.
*G01M 3/04* (2006.01)
*G01N 27/22* (2006.01)

(52) U.S. Cl.
CPC ............ *G01M 3/04* (2013.01); *G01N 27/223* (2013.01)

(58) Field of Classification Search
CPC ...... G01N 27/223; G01N 27/121; G01N 1/22; G01N 1/2273; G01N 2001/2285
See application file for complete search history.

(56) References Cited

U.S. PATENT DOCUMENTS 2,951,764 A * 9/1960 Chase .................. G01N 31/222
426/88
3,033,783 A * 5/1962 Lubben .................. B01D 29/15
228/136

(Continued)

FOREIGN PATENT DOCUMENTS

DE      4125739 A1 * 2/1993 ............... G01N 1/16
DE     19721081 C1    7/1998

(Continued)

OTHER PUBLICATIONS

William H. Cubberly, "SAE Dictionary of Aerospace Engineering", Society of Automotive Engineers, Inc., 1992. (Year: 1992).*

(Continued)

*Primary Examiner* — Patrick Assouad
*Assistant Examiner* — Mark A Shabman
(74) *Attorney, Agent, or Firm* — Harness, Dickey & Pierce, P.L.C.

(57) ABSTRACT

A sensor tube according to the present invention comprises: a tubular body for connecting two connection pipes to each other, wherein the two connection pipes are connected to a humidity sensor, so that the connection pipes transfer steam to the humidity sensor by using circulating air or air discharged from the humidity sensor flow in the connection pipes; and a cover surrounding at least a part of the outer surface of the body to prevent foreign substances having a predetermined size or larger from passing, wherein the body (Continued)

is formed as a porous sintered body which allows stream to be introduced from the outside of the body into the body and be transferred by the circulating air.

10 Claims, 6 Drawing Sheets

(56) References Cited

U.S. PATENT DOCUMENTS

| | | | | |
|---|---|---|---|---|
| 3,045,826 | A * | 7/1962 | Smith | B01D 29/15 |
| | | | | 210/90 |
| 3,126,335 | A * | 3/1964 | Stipe | B01J 47/022 |
| | | | | 210/287 |
| 3,402,596 | A | 9/1968 | Woodruff | |
| 3,977,233 | A * | 8/1976 | Issel | F17D 5/02 |
| | | | | 73/40.5 R |
| 4,020,697 | A * | 5/1977 | Jander | G01N 1/2294 |
| | | | | 73/40.7 |
| 4,186,100 | A * | 1/1980 | Mott | B01D 71/02 |
| | | | | 210/510.1 |
| 4,323,777 | A * | 4/1982 | Baskins | G01N 33/0047 |
| | | | | 250/339.04 |
| 4,661,249 | A * | 4/1987 | Langley | B01D 39/06 |
| | | | | 425/199 |
| 4,709,150 | A * | 11/1987 | Burough | G01N 21/3504 |
| | | | | 250/338.5 |
| 4,735,095 | A | 4/1988 | Issel | |
| 4,759,227 | A * | 7/1988 | Timmons | E02D 1/06 |
| | | | | 73/864.34 |
| 4,923,333 | A * | 5/1990 | Timmons | E21B 43/082 |
| | | | | 405/129.5 |
| 5,222,389 | A * | 6/1993 | Wong | G08B 17/117 |
| | | | | 250/338.5 |
| 5,271,901 | A * | 12/1993 | Issel | G01M 3/042 |
| | | | | 73/40.7 |
| 5,301,538 | A | 4/1994 | Recla | |
| 5,482,677 | A * | 1/1996 | Yao | G01N 1/2273 |
| | | | | 436/178 |
| 5,708,218 | A * | 1/1998 | Jax | G01M 3/04 |
| | | | | 73/864.34 |
| 5,889,217 | A * | 3/1999 | Rossabi | E02D 1/025 |
| | | | | 73/864.74 |
| 5,922,974 | A * | 7/1999 | Davison | G01N 1/405 |
| | | | | 73/864.74 |
| 6,088,417 | A | 7/2000 | Jax et al. | |
| 6,898,962 | B2 * | 5/2005 | Jax | G01M 3/22 |
| | | | | 73/40 |
| 7,255,729 | B2 * | 8/2007 | Yamada | B01D 67/0046 |
| | | | | 96/135 |
| 7,520,186 | B2 * | 4/2009 | Risk | G01N 33/24 |
| | | | | 73/864.74 |
| 7,770,435 | B2 * | 8/2010 | Issel | G01M 3/18 |
| | | | | 73/40 |
| 7,802,465 | B2 * | 9/2010 | Issel | F17D 5/04 |
| | | | | 73/40.7 |
| 8,753,433 | B2 * | 6/2014 | Haring | B01D 53/22 |
| | | | | 95/55 |
| 8,764,888 | B2 * | 7/2014 | Ophir | B01D 67/0093 |
| | | | | 95/52 |
| 8,875,563 | B2 * | 11/2014 | Fleischer | F17D 5/02 |
| | | | | 73/864.33 |
| 9,103,742 | B2 * | 8/2015 | Fleischer | G01M 3/22 |
| 10,359,334 | B2 | 7/2019 | Mueller et al. | |
| 2007/0116402 | A1 | 5/2007 | Slade et al. | |
| 2007/0119238 | A1 | 5/2007 | Issel | |
| 2017/0191897 | A1 | 7/2017 | Mueller et al. | |
| 2021/0140905 | A1 * | 5/2021 | Kim | G01N 1/22 |

FOREIGN PATENT DOCUMENTS

| | | | |
|---|---|---|---|
| JP | H11-218002 A | 8/1999 | |
| JP | 5999421 B2 | 9/2016 | |
| KR | 20-2000-0001129 U | 1/2000 | |
| KR | 101753110 B1 | 7/2017 | |
| KR | 101796918 B1 | 12/2017 | |
| KR | 10-2018-0049120 A | 5/2018 | |
| KR | 10-2020-0092181 A | 8/2020 | |
| WO | WO-2007-065570 A1 | 6/2007 | |
| WO | WO-2015036725 A1 * | 3/2015 | G01N 1/2258 |

OTHER PUBLICATIONS

Espacenet Machine Translation of DE 4125739 A1 Which Originally Published On Feb. 4, 1993. (Year: 1993).*
Carlos M.A. Silva et al., "Environmentally Friendly Joining of Tubes by Their Ends", Journal of Cleaner Production, No. 87, Oct. 18, 2014. (Year: 2014).*
European Office Action dated Apr. 6, 2023 issued in corresponding European Appln. No. 19889171.5.
Extended European Search Report dated Dec. 1, 2021 issued in corresponding European Appln. No. 19889171.5.
Areva "FLUS Leak Detection System for Compartments and Components", Brochure.
P. Jax and V. Streicher. "FLUS—A NewMonitoring System for Leak Detection and Location". Nuclear Society of Slovenia, 2nd Regional Meeting, Nuclear Energy in Central Europe, 11,14 1995, pp. 402-408.
Framatome, "High-Sensitivity Leak Detection and Localization and Humidity Measurement System", FLUS, pp. 1-2, dated 2018.
International Search Report PCT/ISA/210 for International Application No. PCT/KR2019/013317 Dated Feb. 7, 2020.

* cited by examiner

SENSOR TUBE FOR HUMIDITY SENSOR AND HUMIDITY SENSOR ASSEMBLY USING SAME

CROSS-REFERENCE TO RELATED APPLICATIONS

This application is a national phase under 35 U.S.C. § 371 of PCT International Application No. PCT/KR2019/013317 which has an International filing date of Oct. 11, 2019, which claims priority to Korean Patent Application No. 10-2018-0148784, filed Nov. 27, 2018, the entire contents of each of which are hereby incorporated by reference.

TECHNICAL FIELD

The present disclosure relates to a sensor tube used in a humidity sensor assembly for detecting leakage steam, and a humidity sensor assembly using the same.

BACKGROUND ART

The nuclear reactor coolant system regulation standard requires that reactor coolant leakage is detected for a reactor coolant pressure boundary and a leakage detection system for identifying a leakage source within an actually acceptable range is provided. Accordingly, various measures satisfying a certain criterion are used to detect and identify reactor coolant leakage of a nuclear power plant.

Because a reactor coolant system is operated at high temperature and high pressure, the reactor coolant system is surrounded by an insulating material. Therefore, it is very difficult to detect occurrence of leakage and identify a leakage source. A humidity detector, called "FLUS", is used as a leakage detection device applied to the reactor coolant system.

As illustrated in FIG. 1, in an existing FLUS system, a method of filling a side branch 101 installed on one side of a T-shaped sensor tube 100 with a porous material 102 is used. The sensor tube 100 is used in such a manner that external steam is introduced into the sensor tube 100 through the porous material 102 by using diffusion, and air circulating in connecting tubes 104 connected with the sensor tube 100 moves the steam to a humidity sensor that senses a humidity change. The connecting tubes 104 connected to the sensor tube 100 and the humidity sensor may be fastened to the sensor tube by using fastening members 103 such as nuts. However, because the steam is introduced into the sensor tube 100 by using diffusion through the side branch 101 filled with the porous material 102, the surface area of a region into which the steam is able to infiltrate is very small. Accordingly, it takes long time for the steam to infiltrate inside (having a response time of at least 15 minutes to about 1 hour).

DISCLOSURE

Technical Problem

The present disclosure has been made to solve the above-mentioned problems occurring in the prior art while advantages achieved by the prior art are maintained intact. An aspect of the present disclosure provides a sensor tube for facilitating introduction of steam in a humidity sensor assembly for detecting leakage steam, and a humidity sensor assembly using the sensor tube.

Technical Solution

A sensor tube according to an embodiment of the present disclosure includes a tubular main body that connects two connecting tubes that are connected with a humidity sensor and that deliver steam to the humidity sensor using circulation air or allow the circulation air released from the humidity sensor to flow, and a cover that surrounds at least part of an outside surface of the main body to prevent entrance/exit of foreign matter having a predetermined size or larger. The main body is formed of a porous sintered body that allows the steam to be introduced into the main body from outside the main body and carried by the circulation air.

A sensor tube according to an embodiment of the present disclosure includes a tubular reinforcing tube that connects two connecting tubes that are connected with a humidity sensor and that deliver steam to the humidity sensor using circulation air or allow the circulation air released from the humidity sensor to flow, the reinforcing tube having a plurality of internal openings through which the steam enters/exits the reinforcing tube, a main body that surrounds at least part of an outside surface of the reinforcing tube and that is formed of a porous sintered body through which the steam passes, and a cover that surrounds an outside surface of the main body to prevent entrance/exit of foreign matter having a predetermined size or larger.

A humidity sensor assembly according to an embodiment of the present disclosure includes a humidity sensor that obtains humidity in air delivered thereto, a sensor tube that includes a tubular main body formed of a porous sintered body and that is formed such that steam is introduced into the main body from outside the main body, and two connecting tubes that connect opposite ends of the sensor tube and opposite ends of the humidity sensor and allow air to flow between the humidity sensor and the sensor tube. An inner diameter of the main body is formed to be equal to an inner diameter of end portions of the connecting tubes connected to the sensor tube.

Advantageous Effects

Accordingly, higher response speed may be achieved by increasing the surface area of a region where steam infiltrates into the sensor tube.

MODE FOR INVENTION

Figure 1:
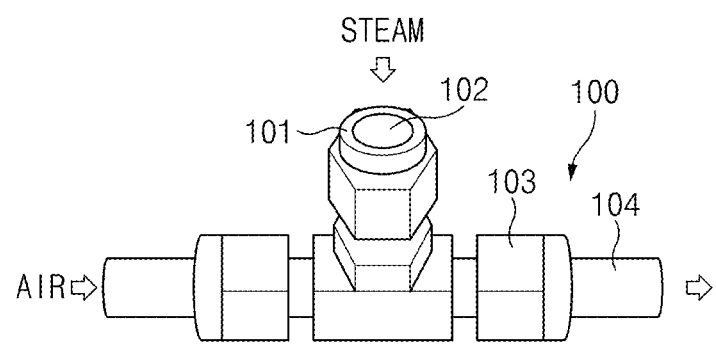
FIG. 1 is a perspective view of a T-shaped sensor tube in the related art.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the components. When a component is described as "connected", "coupled", or "linked" to another component, this may mean the components are not only directly "connected", "coupled", or "linked" but also are indirectly "connected", "coupled", or "linked" via a third component.

One Embodiment

Figure 2:
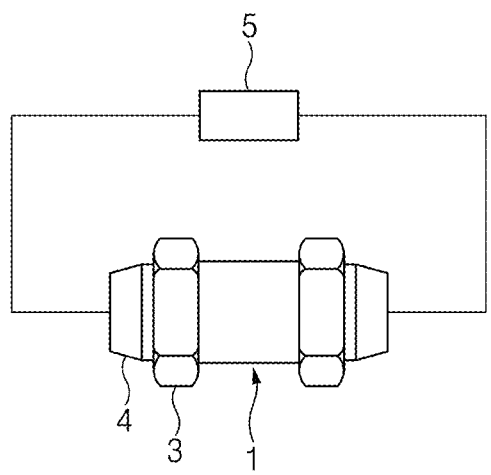
FIG. 2 is a schematic view of a humidity sensor assembly in which a sensor tube according to one embodiment of the present disclosure is used.
Figure 3:
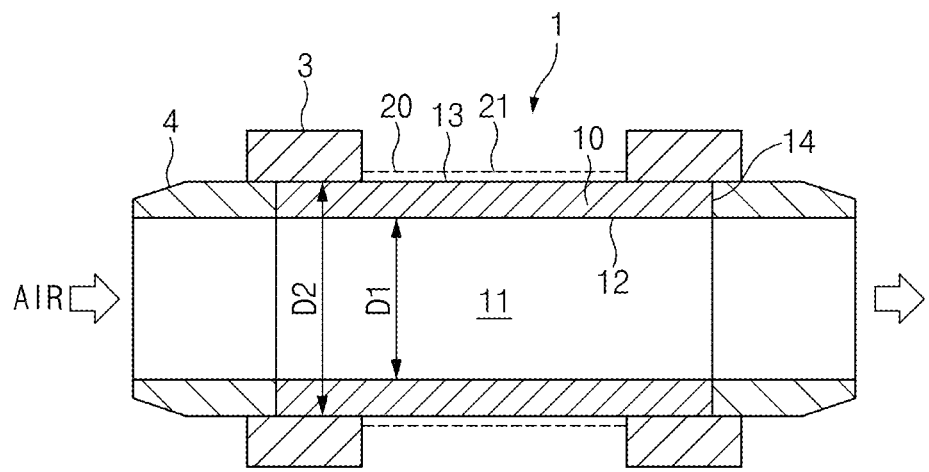
FIG. 3 is a sectional view of the sensor tube according to the one embodiment of the present disclosure.

FIG. 2 is a schematic view of a humidity sensor 5 assembly in which a sensor tube 1 according to one embodiment of the present disclosure is used. FIG. 3 is a sectional view of the sensor tube 1 according to the one embodiment of the present disclosure.

Referring to the drawings, the humidity sensor 5 assembly according to an embodiment of the present disclosure includes the sensor tube 1, the humidity sensor 5, and a connecting tube 4. Furthermore, the sensor tube 1 according to the one embodiment of the present disclosure includes a main body 10 and a cover 20.

Although a situation in which one sensor tube 1 is connected to one humidity sensor 5 is described in the one embodiment of the present disclosure, a plurality of sensor tubes 1 may be connected to the one humidity sensor 5 to form one closed circuit.

Humidity Sensor 5 and Connecting Tube 4

The humidity sensor 5, which is a component for obtaining humidity in air delivered thereto, may be a humidity sensor 5 of a FLUS type. However, the type of the humidity sensor 5 is not limited to the aforementioned type, as long as the humidity sensor 5 is a component that obtains the amount of steam contained in air delivered thereto.

The humidity sensor 5 has an inlet and an outlet. The humidity sensor 5 receives steam-containing circulation air from the sensor tube 1, which will be described below, through the inlet and releases the circulation air through the outlet.

The connecting tube 4 is a component that connects the sensor tube 1 and the humidity sensor 5 and allows air to flow between the humidity sensor 5 and the sensor tube 1. Two connecting tubes 4 may be provided. One of the two connecting tubes 4 may connect one end of the sensor tube 1 and the outlet of the humidity sensor 5, and the other may connect an opposite end of the sensor tube 1 and the inlet of the humidity sensor 5. Accordingly, the sensor tube 1 may connect end portions of the connecting tubes 4.

One of the connecting tubes 4 serves to deliver the circulation air to the sensor tube 1, and the other serves to deliver, to the humidity sensor 5, the circulation air that is mixed with steam in the sensor tube 1 and released from the sensor tube 1.

Sensor Tube 1—Main Body 10

The main body 10 is a component connecting the two connecting tubes 4 that are connected with the humidity sensor 5 and that deliver steam to the humidity sensor 5 using the circulation air. The main body 10 is formed in a tubular shape and has an empty interior space 11 formed therein. The circulation air may flow through the empty interior space 11.

An outside surface 13 of the main body may include connecting areas and an intermediate area. The connecting areas may be formed adjacent to opposite ends 14 of the main body, and the intermediate area may be formed on an intermediate portion with respect to the lengthwise direction of the main body 10.

The connecting areas may be formed adjacent to the opposite ends 14 of the main body so as to be connected with the end portions of the connecting tubes 4. The connecting areas are connected with the end portions of the connecting tubes 4 by using fastening members 3. According to the one embodiment of the present disclosure, the end portion of the connecting tube 4 is inserted into the fastening member 3 from one side, the connecting area is inserted into the fastening member 3 from an opposite side, and the fastening member 3 fastens the two members. To this end, the outer diameter of the end portion of the connecting tube 4 and the outer diameter D2 of the connecting area may be formed to be equal to the inner diameter of the fastening member 3. However, a method of connecting, by the fastening member 3, the connecting area and the end portion of the connecting tube 4 is not limited thereto.

When the fastening member 3 is formed in a shape having a thread on an inside surface like a nut, a thread for connecting the main body 10 to the fastening member 3 may be formed on the connecting area in a shape corresponding to the thread formed on the inside surface of the fastening member 3.

The intermediate area may be the remaining area of the outside surface 13 of the main body other than the connecting areas. Therefore, in the state in which the connecting tubes 4 are connected to the main body 10, the connecting areas are blocked by the fastening members 3, but the intermediate area is only covered by the cover 20, which will be described below, and is disposed such that external steam passes through the intermediate area and flows into the interior space 11. Accordingly, the intermediate area may be an intermediate area that is an area through which steam flowing into the main body 10 from outside the main body 10 passes. When the cover 20 is excluded, a portion exposed to the outside in the state in which the connecting tubes 4 are connected may be the intermediate area.

The inner diameter D1 of the main body 10 may be formed to be in agreement with the inner diameter of the connecting tubes 4. Accordingly, a situation in which flow speed or pressure is suddenly changed when the circulation air passes through the sensor tube 1 may be prevented. Due to the relationship between the inner diameters, inside surfaces of the connecting tubes 4 and an inside surface 12 of the main body may be continuously connected.

The main body 10 is formed of a porous sintered body that allows steam to be introduced into an interior area from outside the main body 10 and carried by the circulation air. A plurality of fine pores through which steam is able to pass may be formed in the porous sintered body. The porous sintered body may be a sintered body formed by sintering chromium (Cr) and nickel (Ni) powders that are metal powders.

After the connecting tubes 4 are connected to the opposite ends 14 of the main body, the circulation air is introduced through the connecting tube 4 in the direction indicated by arrows in the drawing and flows in the interior space 11 along the same direction. Steam leaked from a reactor coolant system may be introduced into the interior space 11 from the outside through the main body 10, and the steam introduced into the interior space 11 is carried in the same direction by the circulation air flowing in one direction. The circulation air is released from the sensor tube 1 in the state of containing the steam and delivered to the inlet of the humidity sensor 5 through the other connecting tube 4, and the humidity sensor 5 measures humidity from the steam in the introduced circulation air.

As the main body 10 is configured in a tubular shape as in the one embodiment of the present disclosure, a surface area by which steam is able to be introduced may be sufficiently ensured depending on applications. Accordingly, introduction of steam into the interior space 11 may be more rapidly performed than introduction of steam into the T-shaped sensor tube 100 (refer to FIG. 1) or a well-type sensor tube (not illustrated) that is used for a connecting tube having the form of bellows, and thus the response speed of the humidity sensor 5 assembly may be improved. Furthermore, as the sensor tube 1 is formed in a tubular shape continuous with the connecting tubes 4, the sensor tube 1 may be used in a narrow gap, and due to the simple form, the sensor tube 1 may be used for various connecting tubes irrespective of the flexibility of the connecting tubes 4.

Sensor Tube 1—Cover 20

The cover 20 is a component that surrounds the main body 10. The cover 20 surrounds at least part of the outside surface 13 of the main body to prevent entrance/exit of foreign matter having a predetermined size or larger. Here, the at least part of the outside surface 13 of the main body may be the above-described intermediate area.

As the cover 20 is formed to prevent the foreign matter having the predetermined size or larger from passing through the cover 20, a plurality of external openings 21 having a diameter small than the predetermined size may be formed in the cover 20. Accordingly, when the foreign matter having the predetermined size or larger is about to pass through the cover 20 from the outside to the inside, the foreign matter is blocked by the external openings 21 of the cover 20 and cannot proceed.

The external openings 21 may be formed in a circular shape, but the shape is not limited thereto. External openings 21 adjacent to each other among the plurality of external openings 21 may be disposed to be spaced apart from each other at a predetermined interval along the lengthwise direction and the circumferential direction of the cover 20. However, the arrangement is also not limited thereto, and various modifications can be made.

The cover 20 may serve to protect the main body 10 from external impact. The cover 20 may be formed of stainless steel and may be formed in a tubular shape surrounding the main body 10 to prevent external foreign matter from applying impact to the main body 10.

The cover 20 may have a smaller length than the main body 10 and may be disposed to surround the intermediate area, so that the cover 20 may be located between the fastening members 3. Accordingly, when the fastening members 3 connect the main body 10 and the connecting tubes 4 in such a manner as to decrease the gap between the fastening members 3, the cover 20 may be fixedly inserted between the fastening members 3.

Other Embodiment

Figure 4:
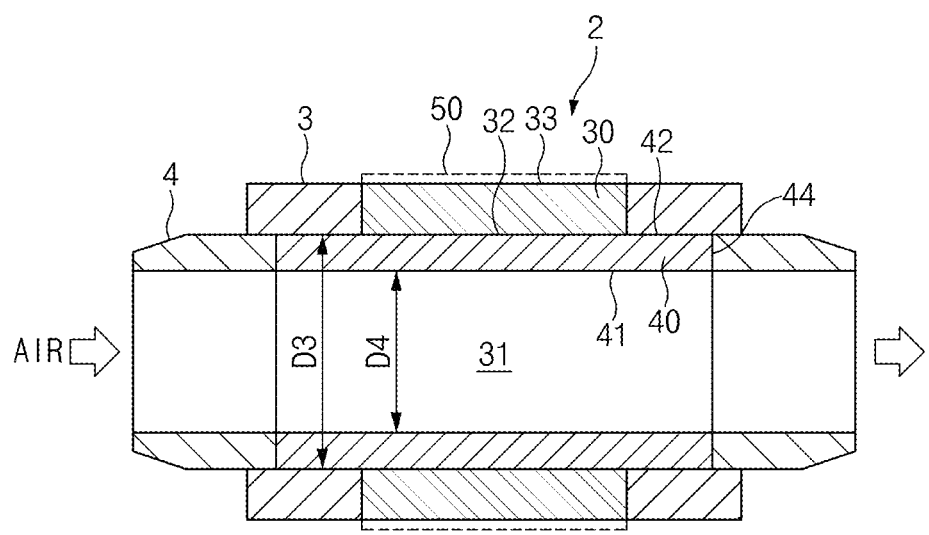
FIG. 4 is a sectional view of a sensor tube according to another embodiment of the present disclosure.
Figure 5:
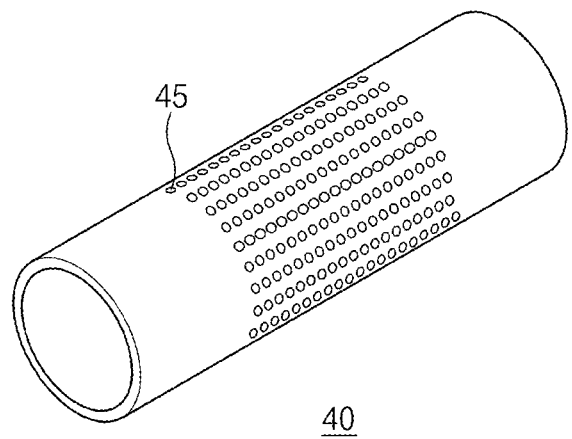
FIG. 5 is a perspective view of a reinforcing tube included in the sensor tube according to the other embodiment of the present disclosure.

FIG. 4 is a sectional view of a sensor tube 2 according to other embodiment of the present disclosure. FIG. 5 is a perspective view of a reinforcing tube 40 included in the sensor tube 2 according to the other embodiment of the present disclosure.

Referring to the drawings, the sensor tube 2 according to the other embodiment of the present disclosure includes the reinforcing tube 40, a main body 30 and a cover 50. Basic descriptions of the main body 30 and the cover 50 are the same as the contents of the one embodiment of the present disclosure described above with reference to FIGS. 2 and 3. Therefore, descriptions of the main body 30 and the cover 50 are replaced with the contents described above, and only the changed parts will be additionally described.

Reinforcing Tube 40

In the sensor tube 2 according to the other embodiment of the present disclosure, the reinforcing tube 40 is connected with connecting tubes 4 through fastening members 3. The reinforcing tube 40 is a tubular component that connects two connecting tubes 4.

The reinforcing tube 40 has a plurality of internal openings 45 that enable entrance/exit of steam. Accordingly, steam passing through the main body 30 may be introduced into an interior space 31 through the internal openings 45. The internal openings 45 may not be formed in areas adjacent to opposite ends 44 of the reinforcing tube. The internal openings 45 may be formed in the remaining area. Likewise to the external openings 21 (refer to FIG. 3) described in the one embodiment, the internal openings 45 adjacent to each other may be disposed to be spaced apart from each other at a predetermined interval. However, the arrangement is not limited thereto.

The reinforcing tube 40 may be formed of stainless steel, and the main body 30 may be disposed on an outside surface 42 of the reinforcing tube 40. As the reinforcing tube 40 is disposed as described above, stress depending on a change in length that is likely to occur when the total length of the sensor tube 2 is increased may be absorbed. Accordingly, the reinforcing tube 40 may prevent deformation of the sensor tube 2 and may maintain the tubular shape well.

In the other embodiment of the present disclosure, the main body 30 may be disposed such that an inside surface 32 of the main body surrounds at least part of the outside surface 42 of the reinforcing tube. The at least part of the outside surface 42 of the reinforcing tube that is covered by the main body 30 may be the remaining area other than the areas adjacent to the opposite ends 44 of the reinforcing tube. Accordingly, the length of the main body 30 may be smaller than the length of the reinforcing tube 40, and the areas adjacent to the opposite ends 44 of the reinforcing tube may further protrude along the lengthwise direction.

For connection with end portions of the connecting tubes 4, the outer diameter D3 of the areas adjacent to the opposite ends 44 of the reinforcing tube may be provided in a size corresponding to the outer diameter of the end portions of the connecting tubes 4. Furthermore, when the fastening members 3 are formed in a shape having a thread on an inside surface like a nut, threads for connecting the reinforcing tube 40 to the fastening members 3 may be formed on areas of the outside surface that are adjacent to the opposite ends 44 of the reinforcing tube and may have a shape corresponding to the threads formed on the inside surfaces of the fastening members 3.

The inner diameter D4 of the reinforcing tube 40 may be formed to be equal to the inner diameter of the end portions of the connecting tubes 4. Accordingly, an inside surface 41 of the reinforcing tube and inside surfaces of the end portions of the connecting tubes 4 may be continuously connected.

In the other embodiment of the present disclosure, the cover 50 may have the same length as the length of the main body 30. As the main body 30 is not fastened to the connecting tubes 4 by the fastening members 3 and is disposed on the outside surface 42 of the reinforcing tube fastened to the connecting tubes 4, the cover 50 does not need to surround only part of an outside surface 33 of the main body.

Similarly to the cover 20 (refer to FIG. 3) in the one embodiment, the main body 30 may be located between the fastening members 3 and may be pressed and fixedly inserted between the fastening members 3 along the lengthwise direction when the fastening members 3 are fastened in such a manner as to decrease the gap between the fastening members 3.

Along the radial direction, the main body 30 is supported by the reinforcing tube 40 from the inside and is supported by the cover 50 from the outside. Accordingly, the main body 30 may be fixedly inserted between the reinforcing tube 40 and the cover 50, and impact of foreign matter on the main body 30 from the inside or the outside may be prevented.

As the sensor tube 2 according to the other embodiment is disposed at the position of the sensor tube 1 of FIG. 2, the humidity sensor 5 assembly may operate.

Another Embodiment

Figure 6:
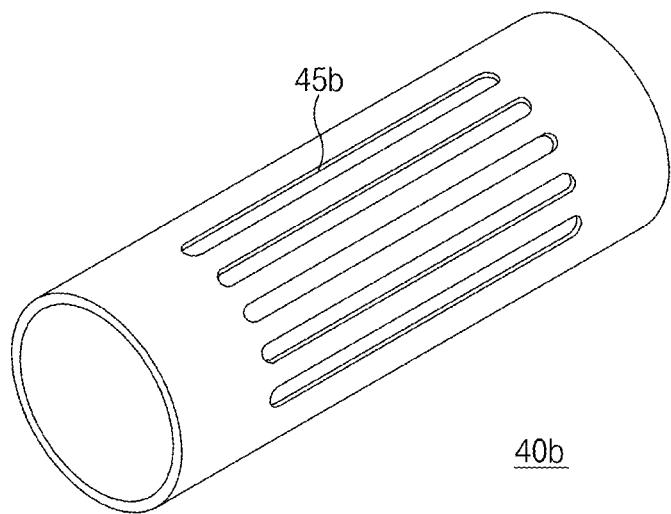
FIG. 6 is a perspective view of a reinforcing tube included in the sensor tube according to the another embodiment of the present disclosure.

FIG. 6 is a perspective view of a reinforcing tube 40b according to another embodiment of the present disclosure. Referring to the drawings, the reinforcing tube 40b may have internal openings 45b which are long hole shaped slots instead of internal openings 45 of FIG. 5 which is formed as normal hole shape. Internal openings 45b may be elongate along the longitudinal direction of the reinforcing tube 40b. The reinforcing tube 40b may be perforated to form internal openings 45b such that steam can access. Plurality of internal openings 45b may be disposed to be spaced apart from each other at a predetermined interval along the circumferential direction of the reinforcing tube 40b. However, the arrangement is also not limited thereto, and various modifications can be made.

The reinforcing tube 40b may be formed of stainless steel. The reinforcing tube 40b may form sensor tube by being disposed inside of the main body 30 of FIG. 4, likewise to the reinforcing tube 40 of FIG. 5 of other embodiment.

Hereinabove, even though all of the components are coupled into one body or operate in a combined state in the description of the above-mentioned embodiments of the present disclosure, the present disclosure is not limited to these embodiments. That is, all of the components may operate in one or more selective combination within the range of the purpose of the present disclosure. It should be also understood that the terms of "include", "comprise" or "have" in the specification are "open type" expressions just to say that the corresponding components exist and, unless specifically described to the contrary, do not exclude but may include additional components. Unless otherwise defined, all terms used herein, including technical and scientific terms, have the same meaning as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

The invention claimed is:

1. A sensor tube comprising:
   a tubular main body configured to connect two connecting tubes, the two connecting tubes connected with a humidity sensor and configured to deliver steam to the humidity sensor using circulation air or allow the circulation air released from the humidity sensor to flow; and
   a tubular cover configured to surround at least part of an outside surface of the main body to prevent entrance/exit of foreign matter having a predetermined size or larger,
   wherein the main body is a porous sintered body configured to allow the steam to be introduced into the main body from outside the main body and carried by the circulation air,
   wherein the outside surface of the main body includes connecting areas adjacent to opposite ends of the main body and configured to be connected with end portions of the connecting tubes, and
   an intermediate area, the intermediate area being an area other than the connecting areas,
   wherein the cover surrounds the intermediate area,
   the sensor tube further comprises fastening members configured to connect the connecting areas and the end portions of the connecting tubes, and
   an outer diameter of the end portions of the connecting tubes and an outer diameter of the connecting areas are equal to an inner diameter of the fastening members,
   wherein an inner diameter of the cover is equal to an outer diameter of the intermediate area, and
   wherein the cover is configured to be fixedly inserted between the fastening members.

2. The sensor tube of claim 1, wherein the porous sintered body includes a plurality of fine pores through which the steam passes.

3. The sensor tube of claim 2, wherein the porous sintered body is a sintered body comprising sintered metal powder.

4. The sensor tube of claim 1, wherein the cover includes a plurality of external openings having a diameter smaller than the predetermined size.

5. The sensor tube of claim 1, wherein the steam flowing into the main body from the outside of the main body passes in a state in which the connecting tubes are connected to the main body, and
   wherein the cover is disposed to surround the intermediate area.

6. A sensor tube comprising:
   a tubular reinforcing tube configured to connect two connecting tubes, the two connecting tubes being connected with a humidity sensor and configured to deliver steam to the humidity sensor using circulation air or allow the circulation air released from the humidity sensor to flow, wherein the reinforcing tube has a plurality of internal openings through which the steam enters/exits the reinforcing tube;

a main body configured to surround at least part of an outside surface of the reinforcing tube and formed of a porous sintered body through which the steam passes; and a tubular cover configured to surround an outside surface of the main body to prevent entrance/exit of foreign matter having a predetermined size or larger, wherein the reinforcing tube includes connecting areas formed adjacent to opposite ends of the reinforcing tube and configured to be connected with end portions of the connecting tubes, and a remaining area, the remaining area being an area other than the connecting areas, and wherein the main body surrounds the remaining area, the sensor tube further comprises fastening members configured to connect the connecting areas and the end portions of the connecting tubes, and an outer diameter of the end portions of the connecting tubes and an outer diameter of the connecting areas are equal to an inner diameter of the fastening members, wherein an inner diameter of the cover is equal to an outer diameter of the main body, and wherein the main body is configured to be fixedly inserted between the fastening members.

7. The sensor tube of claim 6, wherein the reinforcing tube is stainless steel.

8. The sensor tube of claim 6, wherein the main body is shorter than the reinforcing tube and covers the remaining area other than the connecting areas adjacent to the opposite ends of the reinforcing tube.

9. The sensor tube of claim 6, wherein the plurality of internal openings are slots elongated along a longitudinal direction of the reinforcing tube.

10. A humidity sensor assembly comprising:

a humidity sensor configured to obtain humidity in air delivered thereto;

a sensor tube including a tubular main body that is a porous sintered body, the sensor tube configured to receive steam introduced into the main body from outside the main body;

two connecting tubes configured to connect opposite ends of the sensor tube and opposite ends of the humidity sensor, and allow air to flow between the humidity sensor and the sensor tube, wherein an inner diameter of the main body is equal to an inner diameter of end portions of the connecting tubes connected to the sensor tube, wherein the outside surface of the main body includes connecting areas adjacent to opposite ends of the main body and configured to be connected with end portions of the connecting tubes, and an intermediate area, the intermediate area being an area other than the connecting areas; and a tubular cover surrounding the intermediate area, wherein the sensor tube further comprises fastening members configured to connect the connecting areas and the end portions of the connecting tubes, and an outer diameter of the end portions of the connecting tubes and an outer diameter of the connecting areas are equal to an inner diameter of the fastening members, wherein an inner diameter of the cover is equal to an outer diameter of the intermediate area, and wherein the cover is configured to be fixedly inserted between the fastening members.

* * * * *